United States Patent [19]

Schlapp et al.

[11] 4,199,248

[45] Apr. 22, 1980

[54] SELECTIVE COUPLING SYSTEM FOR CAMERAS

[75] Inventors: Werner Schlapp, Asslar; Willi Wiessner, Wetzlar, both of Fed. Rep. of Germany

[73] Assignee: Ernst Leitz Wetzlar GmbH, Wetzlar, Fed. Rep. of Germany

[21] Appl. No.: 850,699

[22] Filed: Nov. 11, 1977

[30] Foreign Application Priority Data

Nov. 25, 1976 [DE] Fed. Rep. of Germany ....... 2653495

[51] Int. Cl.$^2$ ............................................. G03B 17/14
[52] U.S. Cl. ..................................... 354/286; 350/252
[58] Field of Search ................ 354/202, 286; 350/252; 352/142, 231

[56] References Cited

U.S. PATENT DOCUMENTS 2,618,201   11/1952   Bröhl et al. .......................... 354/286
2,715,854   8/1955    Simmons et al. ..................... 350/257
4,017,878   4/1977    Hagiwara ............................. 354/286

FOREIGN PATENT DOCUMENTS 1810353   6/1970   Fed. Rep. of Germany ........... 354/286

*Primary Examiner*—Michael L. Gellner
*Attorney, Agent, or Firm*—Schwartz, Jeffery, Schwaab, Mack, Blumenthal & Koch

[57] ABSTRACT

A photographic camera arrangement is disclosed for cameras which are intended to accept only certain interchangeable lens assemblies. For identification purposes, the bayonet segments of the camera housing and the bayonet segments of the lens assembly, respectively, are furnished with depressions, notches or like recesses and with stubs, ridges or like protrusions which will permit attachment of certain lens assemblies to only a given camera or series of cameras.

3 Claims, 6 Drawing Figures

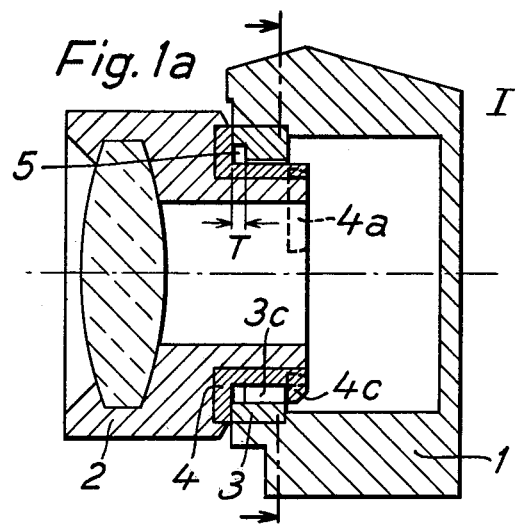
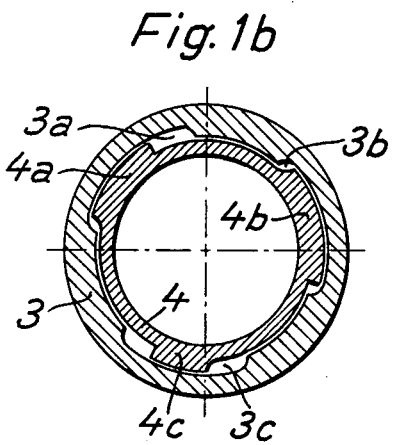
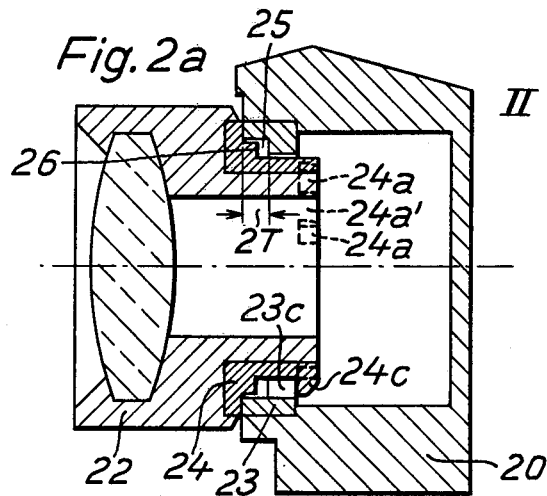
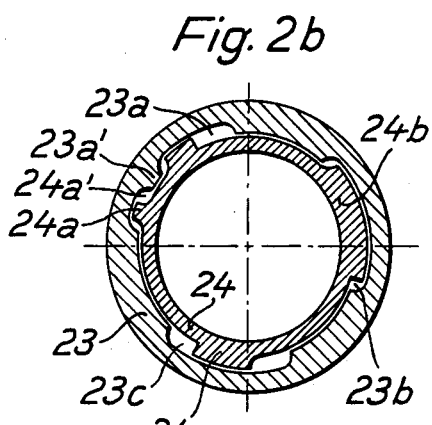
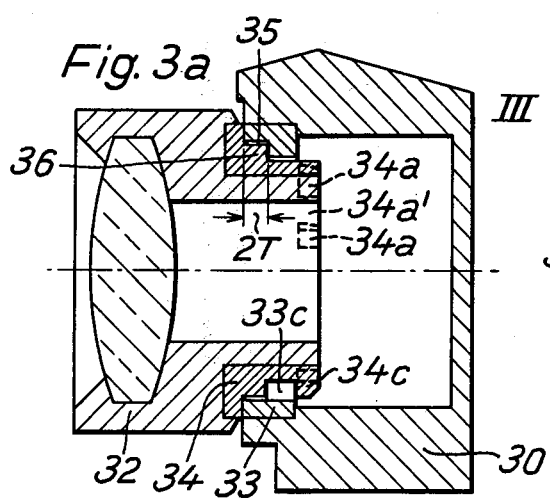
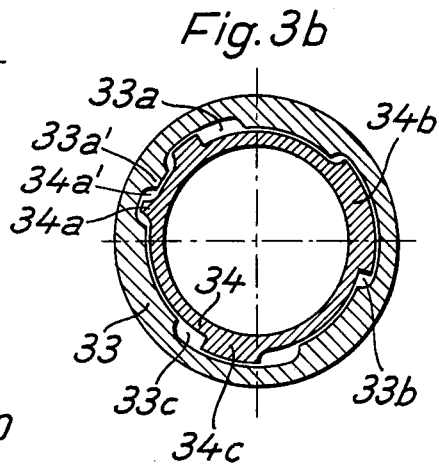

SELECTIVE COUPLING SYSTEM FOR CAMERAS

BACKGROUND OF THE INVENTION

1. Field of the Invention

This invention relates to improvements in photographic system cameras and more particularly, it relates to a bayonet-type coupling arrangement for system cameras having quick-change, bayonet-mount interchangeable lenses.

2. Description of the Prior Art

The term 'system camera', refers to a camera that is part of a family or series of cameras, emanating from a basic design or concept, which undergoes changes from one particular camera model to the next, with successive models in the course of time.

In a system camera various components may be changed over the course of time, such as, for example, the light meter, the shutter system, the housing configuration, as well as other like components and sub-assemblies. On the other hand, major sub-assemblies such as, for example, interchangeable lenses, remain substantially unchanged from one model to the next.

Under these circumstances it is a justifiable market demand that a new camera model, immediately succeeding a predecessor model, should be adapted to accept the lens or objective assembly of the older camera model.

While such a demand from one model to the next in a series is justified, the interchangeability requirement becomes an undue burden as the number of models in the series is increased. Thus, the overall technical advancement of the system camera becomes restricted since a camera designer is limited by the interchangeability requirement. Nevertheless, periodically, parts of the objective or lenses have to be redesigned, such as, for example, the lens mounts. Such a change becomes a consideration when converting a particular model from an external light meter to an internal light meter, particularly a through-the-lens (TTL) light meter.

SUMMARY OF THE INVENTION

It is, therefore, an object of the present invention to provide an arrangement for a bayonet-type coupling for attaching, mounting or coupling a lens or objective assembly to the camera which arrangement will make it possible to distinguish between objectives intended and not intended to be used with a particular camera model.

According to another object of the present invention, means are integrally provided with the objective or lens sub-assembly on the one hand and with the camera housing on the other hand. Yet, another object is to provide an arrangement in which it is not possible to mount an objective to a particular camera model which was not intended for use with that particular model.

According to the present invention, these objects are achieved by providing a camera with a first bayonet coupling element for attachment of interchangeable lens assemblies which each comprise a second bayonet coupling. The first coupling is provided with at least one recess or protrusion such that only lens assemblies having couplings capable of mating with said first couplings may be coupled to the camera.

The camera or first coupling element may be a female bayonet coupling which is provided with distinguishing means for distinguishing between the different lens assemblies based on the male bayonet coupling elements of the assemblies. The distinguishing means may comprise notches and protrusions or similar depressions and ridges which are arranged such that only objectives having appropriately formed male bayonet elements can be used for a particular female bayonet element of a camera housing, i.e., objectives of a current model can only be coupled to a limited number of earlier models.

Thus, when redesigning a camera model, not all of the previous objectives have to be considered, but only those of recent vintage.

The cooperating notches and protrusions on both sections of the bayonet-type coupling can, for example, be contained in the existing bayonet segments and thus would extend substantially in a radial direction. Alternatively, they can be arranged axially on the front ends of the coupling parts. Also, the notches and protrusions can comprise combinations of radial and axial notches and protrusions.

Thus, a selective bayonet-type coupling for photographic cameras is provided having bayonet-mount, interchangeable lenses wherein both parts of the bayonet-mount or coupling have cooperating recesses and protrusions which are arranged such that a camera housing having a female bayonet section can only accommodate lenses having a male bayonet section of the latest camera model, as well as a limited number of prior models.

In accordance with another feature of the present invention, a selective bayonet-type coupling is provided wherein the notches and ribs or ridges form part of the radially extending bayonet sections.

In accordance with yet another feature of the invention, a selective bayonet-type coupling is provided wherein the recesses are counter-sunk bores having shoulder stops, and the ridges are annular ridges and the recesses and the ridges extend in an axial direction.

In accordance with still another feature of the invention, a selective bayonet-type coupling is provided wherein the two coupling sections comprise a combination of axial and radial notches and ridges.

BRIEF DESCRIPTION OF THE DRAWINGS

FIG. 1a is a schematic side view, in cross-section, of a lens inserted, but not secured, in a camera model I, representing an earlier model;

FIG. 1b shows, in front elevation, a cross-section through the bayonet coupling in accordance with FIG. 1a;

FIG. 2a is a view, similar to FIG. 1a, showing a lens inserted, but not secured, in camera model II, representing an advanced design;

FIG. 2b is a view, similar to FIG. 1b, in accordance with the embodiment shown in FIG. 2a;

FIG. 3a is a view, similar to FIG. 1a, showing a lens inserted, but not secured, in camera model III; and, FIG. 3b is a view, similar to FIG. 1b, in accordance with the embodiment shown in FIG. 3a.

DESCRIPTION OF THE PREFERRED EMBODIMENTS

A first camera model I, shown in FIG. 1a, comprises a camera housing 1 which is to receive lens or objective assembly 2. The camera housing 1 comprises a female bayonet or coupling element 3 while the lens assembly 2 comprises a male bayonet or coupling element 4. Bayonet element 3 is a ring having a uniform outer diameter which is, for example, pressed into a counter-sunk bore in camera housing 1. Alternatively, the female bayonet element 3 can be formed integrally with the camera housing 1. Similarly, male bayonet element 4 is pressed into a circular groove, extending concentrically with the lens diameter or, alternatively, the male bayonet element is formed integrally with the lens mount. The construction of the bayonet section is well known in the art and does not form a part of the present invention with the exception of the particular modification to the known parts, as will be described in more detail below.

On its inside diameter the female bayonet section 3 comprises gate openings 3a, 3b and 3c. These openings, which may, for example, be evenly distributed, are sized such that they permit passage of the male bayonet element 4 which has raised protrusions or border sections, ledges or ridges 4a, 4b and 4c extending axially along the foremost face of the male bayonet section 4.

By inserting the male bayonet element 4 into the female bayonet element 3 and turning bayonet section 4 by about a quarter turn, for example, and securing the unit by a catch (not shown) the objective 2 is securely attached to camera housing 1.

Towards the front of the camera, the bayonet section 3 further comprises a counter-sunk opening or recess 5 ending in a shoulder stop having a depth indicated by the letter 'T'. The purpose of this recess or opening will be described further below.

The embodiment of the invention shown in FIG. 2a and FIG. 2b comprises a camera model that is more advanced in the series than camera model I shown in FIGS. 1a and 1b. Camera housing 20 of camera model II has a female bayonet section 23. Lens assembly 22, intended to be used with this camera model, comprises a male bayonet section 24. The two bayonet sections 23 and 24 are formed similarly as bayonet sections 3 and 4 of camera model I, FIGS. 1a and 1b, and thus, comprise gate openings 23a, 23b and 23c, as well as bayonet protrusions 24a, 24b and 24c, respectively.

In addition, the female bayonet element 23 comprises an entry limiting means such as ribs or stubs 23a' in its gate opening 23a. Bayonet section 23 further comprises a recess or counter-sunk opening 25 (FIG. 2a) which ends in a shoulder stop and has twice the depth of the recess 5 in bayonet section 3 of camera model I. Thus, the depth of the recess 25 is 2T.

In order to attach the lens assembly 22 to camera model II, the bayonet coupling element 24 has a further notch or cut-out 24a' in its bayonet border or flange section 24a to allow full passage of the bayonet section 24 into bayonet coupling element 23. Bayonet element 24 also comprises an annular step, ledge or ridge 26, sized to permit entry into recess 25 such that upon full penetration of bayonet section 24, the annular step 26 reaches about halfway into the opening afforded by recess 25. Thus, the annular step 26 has a width of about depth 'T' while its diameter is slightly less than that of recess 25.

FIG. 3a shows a still further advanced camera model III having a camera housing 30. Towards the front of the camera housing 30, a female bayonet section 33 is provided. The corresponding interchangeable lens assembly 32 comprises male bayonet section 34.

The overall dimensions of the bayonet sections 33 and 34 correspond to those of bayonet sections 23 and 24 (FIG. 2a). Thus, female bayonet element 33 has an entry limiting means such as a stub or protrusion 33a' while bayonet element 34 has a corresponding entry permitting recess 34a' corresponding in size and location to stub 23a' and recess 24a' (FIG. 2b), respectively.

Further, the bayonet section 33 has a recess 35 whose depth, as well as that of the recess 25 in bayonet section 23 (FIG. 2a), is 2T. The distinguishing feature of this assembly is an annular step or ledge 36 which has a width, measured in the axial direction, of 2T.

In summary, the lenses having male bayonet sections or rings 4, 24 and 34, have distinguishing features such as annular ridges 26 and 36, respectively, and notches or cut-outs 24a' and 34a', respectively. The camera model can have a female bayonet section 3, 23 and 33, which, in turn, can have distinguishing features such as stubs 23a' and 33a', respectively, and recesses 5, 25 and 35.

The interchangeability of the lenses to ensure that only the intended objectives or lens assemblies are employed in a given camera model will now be illustrated with respect to the three camera models depicted in FIGS. 1 to 3.

1. The lens assembly with the male bayonet section 4 can be attached only to camera model I (FIG. 1a) since it does not comprise a groove or notch in bayonet section 4a which would permit mounting on camera model II (FIG. 2a) or camera model III (FIG. 3a).

2. Lens assembly 22 can be mounted in camera models I and II. The notch 24a' in bayonet section 24a is inconsequential. A stub to cooperate with notch 24a' is not required for mounting a lens assembly. The annular ridge 26 with height T, which might interfere with the mounting, is fully received in recess 5 in female bayonet section 3. Lens assembly 22 can also be used in camera model III (FIG. 3a) because the dimensions of stubs 23a' and 33a' and grooves 24a' and 34a', respectively, are identical, as described. Further, the recess 35 in female bayonet section 33 leading up to the shoulder stop and the recess 25 in female bayonet section 23 have a depth of 2T and, thus, can fully accommodate the annular ridge 26, with the height T, on male bayonet section 24.

3. Lens assembly 32 can be mounted in camera model III (FIG. 3a) and model II (FIG. 2a) because of the congruence in dimensions of the respective notches 24a' and 34a' and stubs 23a' and 33a'. The only difference resides in the height of annular ridge 36 which is 2T while annular ridge 26 has a height of T. The depth of recess 25 is 2T so that it can receive the lens assembly 32.

The lens assembly 32 cannot be mounted in camera model I (FIG. 1a) because recess 5 has only a depth T, while the annular ridge 36 of male bayonet section 34 has a depth of 2T. As a result, effective mounting cannot be carried out.

Thus, by providing distinguishing features, such as notches and annular ridges on the male bayonet ring sections and annular recesses and stubs on the female bayonet sections, the interchangeability of lenses can be controlled such that after development of a number of new models, no particular attention needs to be given to lenses with older mounts.

The invention has now been described with respect to specific embodiments. However, it is to be noted that the present invention is not to be limited to any particular cameras or objectives and may be modified in accordance with known techniques.

What is claimed is:

1. A plurality of cameras forming at least first and second distinct groups, such as, for example, corresponding to different model types, said first group corresponding, for example, to older model cameras and said second group corresponding, for example, to newer model cameras;

each camera of said first group comprising:
- (a) a camera body portion;
- (b) a first coupling element integral with said body portion;
- (c) a lens assembly;
- (d) a second coupling element integral with said lens assembly;
- (e) said first and second coupling elements having complimentary mating portions for coupling with one another;
- (f) said complimentary mating portions comprising:
  - (1) a plurality of radially extending recesses and protrusions, and
  - (2) a plurality of axially extending shoulders and counter-sinks;

each camera of said second group comprising:
- (a) a camera body portion;
- (b) a first coupling element integral with said body portion;
- (c) a lens assembly;
- (d) a second coupling element integral with said lens assembly;
- (e) said first and second coupling elements having complimentary mating portions for coupling with one another;
- (f) said complimentary mating portions comprising:
  - (1) a plurality of radially extending recesses and protrusions, and
  - (2) a plurality of axially extending shoulders and counter-sinks;

said first coupling element of said second group having means for preventing coupling thereto of said second coupling element of said first group, said preventing means comprising at least one of said radially extending protrusions of said first coupling element of said second group, whereby, for example, older model lens assemblies may not be utilized with newer model camera body portions, and said second coupling element of said second group adapted for coupling with said first coupling element of said first group, whereby, for example, said newer model lens assemblies may be utilized with said older model camera body portions.

2. A plurality of cameras as recited in claim 17 further comprising a third group of cameras, corresponding, for example to a newest model camera, each camera of said third group comprising:
- (a) a camera body portion;
- (b) a first coupling element integral with said body portion;
- (c) a lens assembly;
- (d) a second coupling element integral with said lens assembly;
- (e) said first and second coupling elements having complimentary mating portions for coupling with one another;
- (f) said complimentary mating portions comprising:
  - (1) a plurality of radially extending recesses and protrusions substantially corresponding to said radially extending recesses and protrusions of said complimentary portions of said second group, and
  - (2) a plurality of axially extending shoulders and counter-sinks;

said first coupling element of said third group having means for preventing coupling thereto of said second coupling element of said first group, said preventing means comprising at least one of said radially extending protrusions corresponding to said at least one radially extending protrusion of said second group; and said first coupling element of said third group adapted for coupling with said second coupling element of said second group;

whereby, for example, newer and newest model camera body portions may be utilized interchangeably with corresponding lens assemblies but older model lens assemblies may not be utilized with the newer or newest model camera body portions.

3. A plurality of cameras as recited in claim 2 wherein said first coupling element of said third group has means for preventing coupling thereto of said second coupling element of said first group, said coupling preventing means comprising at least one axially extending shoulder of said third group whereby, for example, newest model lens assemblies may not be utilized with older model camera body portions.

* * * * *